United States Patent [19]
Marra et al.

[11] Patent Number: 6,042,201
[45] Date of Patent: Mar. 28, 2000

[54] PENALTY BRAKE REDUCTION IN COMPUTER CONTROLLED TRAIN BRAKE SYSTEM

[75] Inventors: Jon M. Marra, Henderson; Roger B. Lewis, Ogdensburg, both of N.Y.

[73] Assignee: New York Air Brake Corporation, Watertown, N.Y.

[21] Appl. No.: 09/015,077

[22] Filed: Jan. 29, 1998

[51] Int. Cl.[7] .................................................. B60T 8/34
[52] U.S. Cl. ................................................ 303/128; 303/3
[58] Field of Search .............................. 303/128, 3, 14, 303/15, 16, 20; 701/70, 19, 20

[56] References Cited

U.S. PATENT DOCUMENTS

| | | | |
|---|---|---|---|
| 5,249,125 | 9/1993 | Root et al. | |
| 5,412,572 | 5/1995 | Root et al. | 701/70 |
| 5,718,487 | 2/1998 | Roselli et al. | 303/14 |
| 5,721,683 | 2/1998 | Joyce, Jr. et al. | 701/70 |

*Primary Examiner*—Robert J. Oberleitner
*Assistant Examiner*—Melanie Talavera
*Attorney, Agent, or Firm*—Barnes & Thornburg

[57] ABSTRACT

In a computer controlled train brake system, a controller provides a penalty brake handle signal using a penalty input and the brake handle signal, and controls the train brakes using the brake handle signal and the penalty brake handle signal. The penalty input determines whether the brake handle signal or the penalty brake handle signal is used to control train braking. The brake handle signal is used if the brake handle signal is at least a predetermined value during a penalty. The generation of a brake handle signal is delayed and is not generated if corrective action is taken before the expiration of the delay.

29 Claims, 3 Drawing Sheets

PENALTY BRAKE REDUCTION IN COMPUTER CONTROLLED TRAIN BRAKE SYSTEM

BACKGROUND AND SUMMARY OF THE INVENTION

The present invention relates generally to computer controlled train brake system and more specifically to improvement in the penalty brake reduction in a computer controlled train brake system.

Computer controlled brake equipment including microprocessors and electropneumatic controls replacing, for example, a 26-L brake equipment of New York Air Brake Corporation, Watertown, N.Y., is presently being offered as CCB system from the same New York Air Brake Corporation. This system, generally described in U.S. Pat. No. 5,249,125 as an example, responds to a penalty condition similar to P2A brake application valve of the pneumatic brake system. As described in FIG. 13 of U.S. Pat. No. 5,249,125, the brake pipe is controlled by a) turning off the penalty indicator if the penalty has been reset; b) turning on the penalty indicator, starting penalty timer and setting desired pressure for minimum service if a penalty has been activated; c) setting desired pressure for full service if penalty timer has reached its limit and d) resetting penalty if the handle is in suppression and set brake pipe pressure equal to the last desired pressure. The brake pipe is controlled by controlling the equalization reservoir pressure.

While the prior CCB system has computerized the pneumatic control in response to a penalty, it has not expanded the capability of controlling the brake pipe in combination with the penalty brake application.

In a computer controlled train brake system including a brake controller which receives a brake handle signal from a brake handle and controls pneumatic train braking in response to the brake handle signal, the improvement of the present invention includes the controller providing a penalty brake handle signal using a penalty input and the brake handle signal, and controls the train brakes using the brake handle signal and the penalty brake handle signal. The penalty input determines whether the brake handle signal or the penalty brake handle signal is used to control train braking. The brake handle signal is used if the brake handle signal is at least a predetermined value during a penalty. Also, the brake handle signal is used in absence of a penalty. During receipt of an inactive signal, the brake handle signal is used to control the train brake even in the presence of a penalty. The penalty process is inactive when in the trailing mode.

The generation of a brake handle signal is delayed and is not generated if corrective action is taken before the expiration of the delay. The corrective action is determined by monitoring the braking state of the train brakes and determining whether the braking state of a predetermined value is present before the expiration of the delay. The reservoir used for controlling the train braking is monitored to determined the state of braking. Also, the brake handle signal may be used to determine a corrective action. A penalty may be received from automatic train control switch or a deadman's switch.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
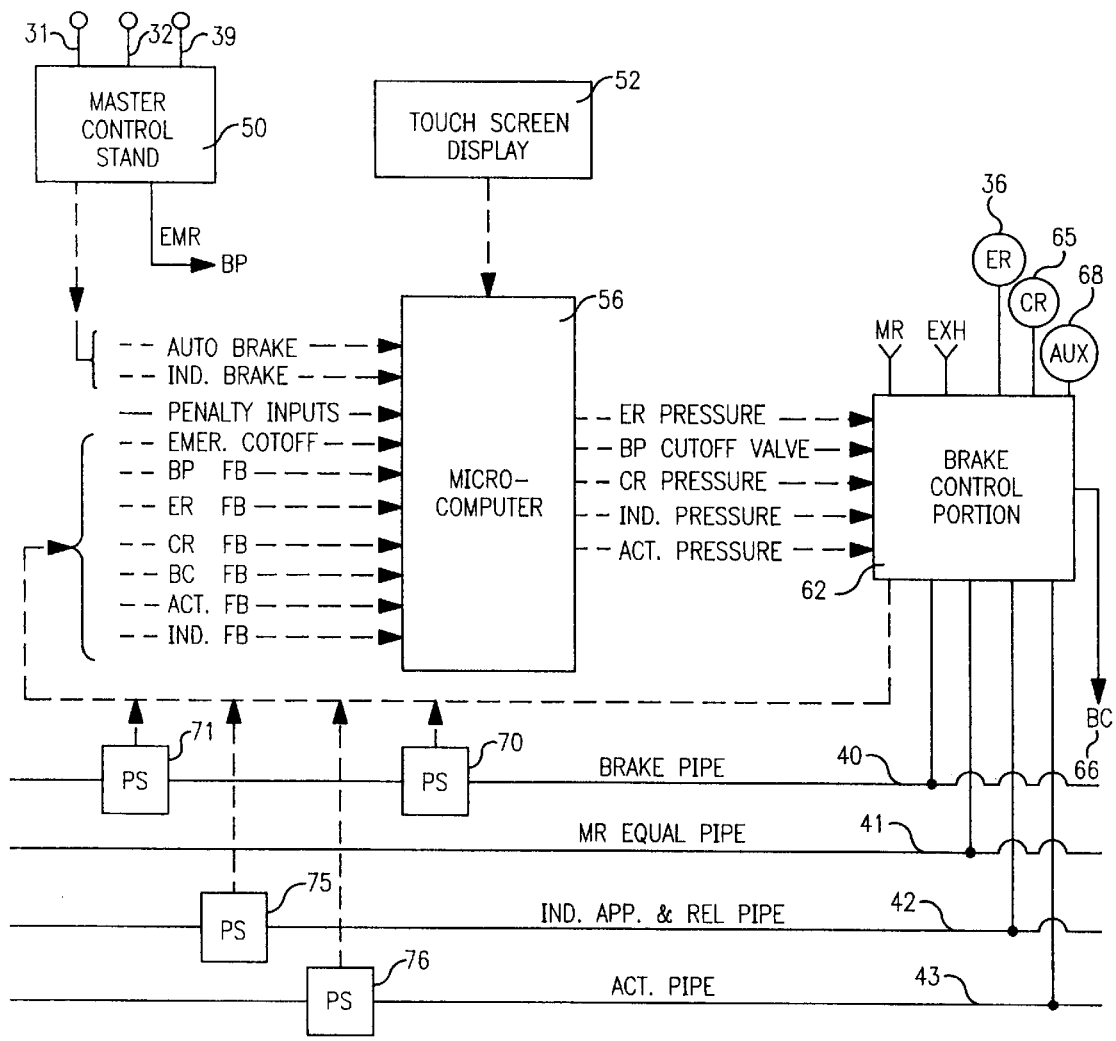
FIG. 1 is a block diagram of an electropneumatic train brake system or computer controlled train brake system on which the present invention can be used.

A computer controlled train locomotive brake equipment is shown in FIG. 1. The system is a CCB available from New York Air Brake Corporation and is described in U.S. Pat. No. 5,249,125 which is incorporated herein by reference. A master control stand 50 includes an automatic brake handle 31, an independent brake handle 32 and a throttle 39. A touch screen display 52 is also provided to interface with the engineer or operator. The screen includes various information, one of which is a warning related to penalty brake pipe reduction. A microcomputer 56 receives inputs from the master control stand 50 and the touch screen display 52. Further inputs of the microcomputer 56 includes pressure signals from brake pipe 40, independent application and release pipe 42 and actuating pipe 43. Further, the microprocessor 56 includes penalty inputs. Additional pressure signals include the brake cylinder, control reservoir, equalization reservoir and emergency cut-off received from the brake portion 62. The brake control portion 62 is an electropneumatic system which receives equalization reservoir pressure, brake pipe cut-off valve, control reservoir pressure, independent pressure and actuating pressure signals from the microcomputer 56 and controls the values in the equalization reservoir 36, the control reservoir 65 and the auxiliary reservoir 68 to control the locomotive brake BC as well as the pressure on the various train pipes.

The system in FIG. 1 is just an overview of a general computer controlled braking system in a locomotive in which the present invention is incorporated. The computer controlled train braking system can be used and is not considered to be the only system in which the present invention can be used. For example, the present system may be used on any microprocessor or computer controlled locomotive brake system, for example, the CCB II available from New York Air Brake Corporation.

Figure 2:
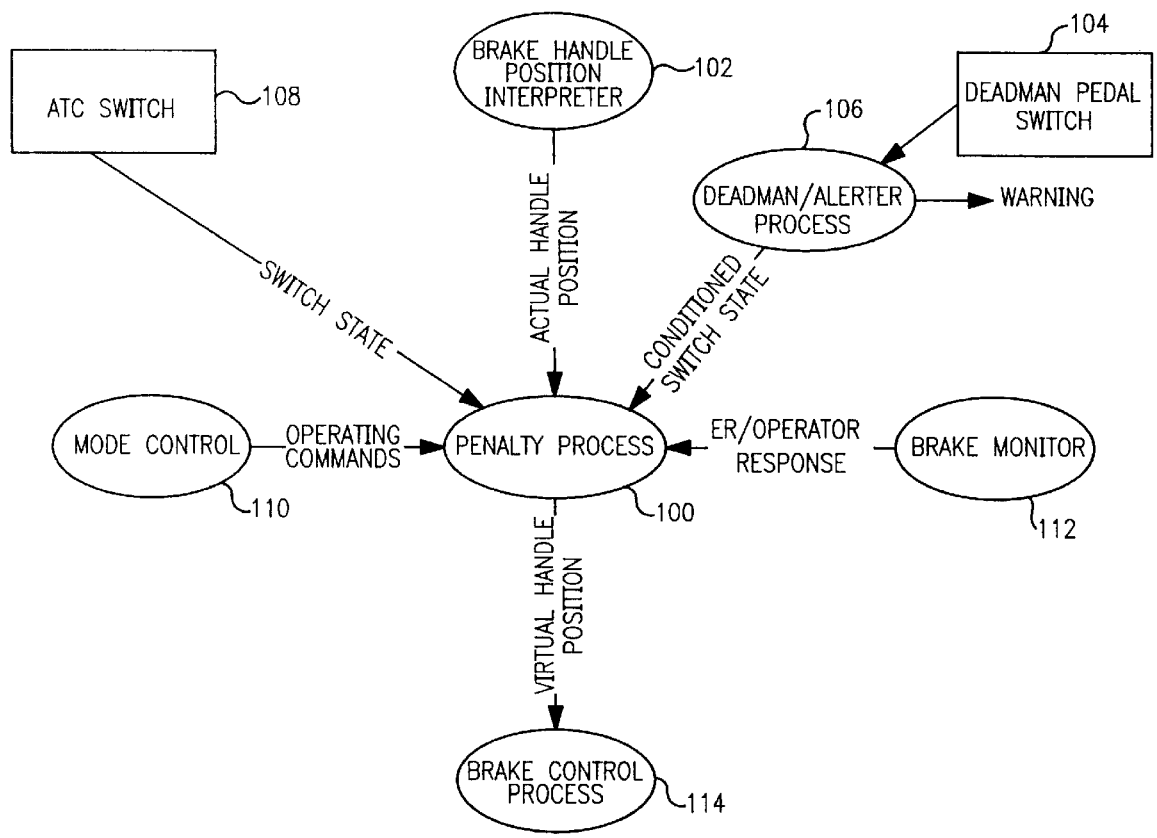
FIG. 2 is a flow chart of a computer controlled train brake control system incorporating penalty reduction according to the principles of the present invention.

The data flow within the microcomputer 56 using the present invention is illustrated in FIG. 2. A penalty process 100 receives actual brake handle positions from brake handle position interpreter 102 and penalty inputs from a deadman pedal switch 104 through deadman/alert process 106 and from automatic train control switch (ATC) 108. Additionally, the penalty process 100 receives operating commands from mode control 110 which indicates whether the particular locomotive is in the leader or trail modes and an input from brake condition monitor 112 which indicates the operator's response and the degree of braking. Based on all of these inputs, the penalty process 100 provides brake handle signals to brake process 114 which controls the braking system using, for example, electropneumatic brake control portion 62 to control namely, the brake pipe pressure using the handle position provided by the penalty process 100.

It should be noted that all of the elements shown as ellipses in FIG. 2 are software implementations within the microcomputer or processor 56. For example, the penalty process 100 and the brake signal process 114 are merely subroutines within the microcomputer 56. Similarly, the deadman/alert process and brake handle position interpreter 102 are also subroutines within the microcomputer 56, as is brake monitor 112 and mode control 110. Mode control 110 may be merely a stored value or flag as are the results of the brake monitor 112.

The mode control 110 is set either in a lead or trail mode. If this locomotive is in its lead mode, the penalty process 110 and brake control process 114 are operable to control not only the locomotive brake of this locomotive, but also the brake pipe for the train braking. If the mode control 110 is in the trail position, the penalty process 100 and the brake control process 114 will only control the local braking of the locomotive and not control the brake pipe for train braking.

The brake handle position interpreter 102 receives input signals from the automatic brake handle 31 and provides a brake handle position signal to the penalty process 100. The ATC switch 108 and the deadman pedal switch 104 provide penalty inputs to the penalty process 100 as well as warnings to the operator at the touch screen display 52. A deadman/alter process 106 provides the switched state of the deadman's pedal switch 104 as well as providing the warning to the touch screen display 52. The ATC switch 108 also provides a warning at the touch display screen 52. The waring may also be provided as other visual or oral indicators in the locomotive cabin. The state of the ATC switch 108 and the deadman pedal switch 104 is stored as a flag or penalty bit and used by the penalty processor 100.

Upon determining a penalty state, the penalty process 100 set a time or delay period to determine whether the operator has taken corrective action. Corrective action is determined by brake monitor 112. If corrective action has been taken before the end of the time period, the penalty process 100 will not calculate a penalty brake handle signal but will provide the actual brake handle signal received from the brake handle position interpreter 102. The brake monitor 112, upon determining the corrective action, will set a permanent suspension flag which will disable the calculation of a penalty brake reduction. The brake monitor 112 will determine an operator's response by measuring either the position of the brake handle 31 or a service reduction of approximately 25 pounds, for example, of the equalization reservoir pressure.

It should be noted that the operator's response need not occur within the time delay period, but that it must be in that state during that period. For example, at the time of the occurrence of the penalty, the brake handle may already be in a full service position or a service brake reduction of 25 pounds may have already occurred. Thus, the corrective response may have occurred before the penalty, and therefore disabled the penalty process from calculating the penalty brake position signal.

If the operator has not complied with the warnings produced by the ATC switch 108 or the deadman pedal switch 104, the penalty processor 100 will calculate an appropriate brake handle signal to cause a service brake application by reducing the equalization reservoir by 30 PSI, for example. Once this reduction has been made, the penalty process 100 will cause the system to lap and not further reduce the equalization reservoir pressure. The penalty process 100 then determines whether the operator has moved the brake handle to the full service position. If the operator has done so, and the cause of penalty has been removed, the brake handle position from brake handle position interpreter 102 will become the brake handle signal provided by the penalty process 100 to the brake control process 114. This will allow the operator to regain control of the brake handle and operation of the brake system.

The present system is different from the prior art systems. In the prior art systems, for a penalty input, the equalization reservoir is reduced to zero at a service rate. In the present system, for a penalty input, the equalization reservoir is reduced to a service application reduction. This leaves additional pressure in the equalization reservoir and allows the operator to further reduce the brakes by an overbraking, if desired. Similarly, if a service brake application has already taken place, no additional braking in response to the penalty is required. This again preserves pressure in the equalization reservoir to allow further control by the operator even though a penalty is present.

Figure 3:
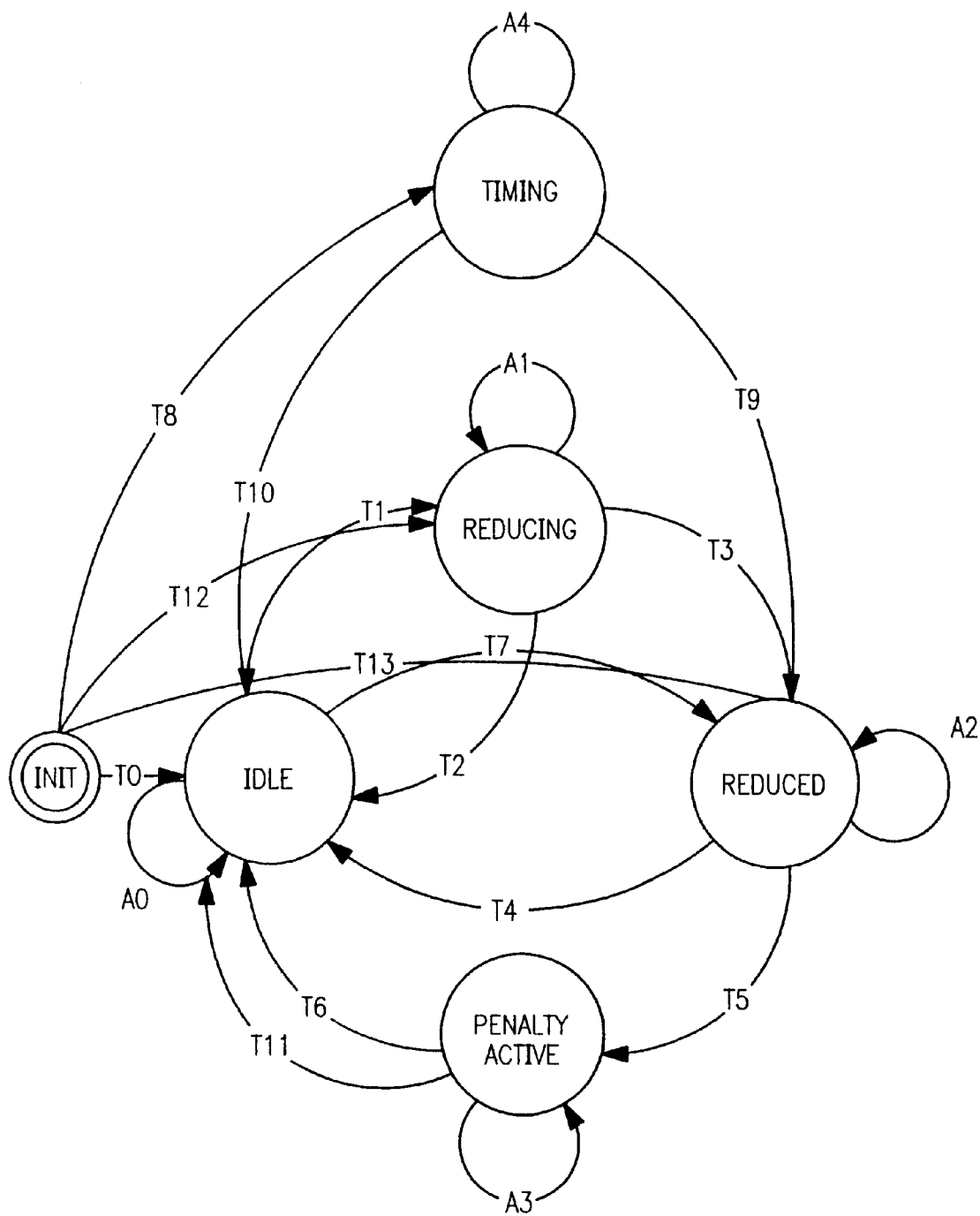
FIG. 3 is a dynamic model of a computer controlled train brake control system processing the penalty incorporating the principles of the present invention.

A dynamic model of the process formed by the penalty process 100 and the brake control process 114 is illustrated in FIG. 3. The specific events, actions and states are described in detail in Table 1.

Although the present invention has been described and illustrated in detail, it is to be clearly understood that the same is by way of illustration and example only, and is not to be taken by way of limitation. The spirit and scope of the present invention are to be limited only by the terms of the appended claims.

TABLE 1

| Transition | Input/Event | Output/Action | Old State | New State |
|---|---|---|---|---|
| T0 | Power up, no power up penalty present | release reported brake handle position | Init | Idle |
| T1 | Penalty bit(s) set | set reported brake handle position to FS, make a note of current ER pressure | Idle | Reducing |
| T2 | Inactive Command received | release reported brake handle position | Reducing | Idle |
| T3 | Penalty Reduction complete | set reported brake handle position to LAP | Reducing | Reduced |
| T4 | Inactive Command received | release reported brake handle position | Reduced | Idle |
| T5 | Handle moved to FS position | | Reduced | Penalty-active |
| T6 | No Penalty | release reported brake handle position | Penalty-Active | Idle |
| T7 | Penalty invoked and ER reduction already made | set reported brake handle position to LAP | Idle | Reduced |
| T8 | Power up penalty bit set and Active command received | set reported brake handle position to FS, start power up initialization timer | Init | Timing |
| T9 | Timer expires | set reported handle position to LAP | Timing | Reduced |
| T10 | Inactive command received | release reported handle position | Timing | Idle |
| T11 | Inactive command received | release reported handle position | Penalty Active | Idle |
| T12 | Power up and other than power up penalty set, ER > 40 | Set reported brake handle position to FS, make a note of current ER pressure | Init | Reducing |
| T13 | Power up and other than power up penalty set, ER < 40 | Set reported brake handle to LAP | Init | Reduced |
| A0 | | | | |

TABLE 1-continued

| Transition | Input/Event | Output/Action | Old State | New State |
|---|---|---|---|---|
| A1 | | | | |
| A2 | | | | |
| A3 | | | | |

What is claimed:

1. In a computer controlled train brake system including an electropneumatic brake controller which receives a brake handle signal from a brake handle and controls pneumatic train braking in response to the brake handle signal, said brake controller further comprising:
   a penalty input;
   a penalty process in the brake controller providing a penalty brake handle signal using said penalty input and said brake handle signal; and
   a brake process in the brake controller controlling said train braking using said brake handle signal and said penalty brake handle signal.

2. A system according to claim 1, wherein said penalty process receives said brake handle signal and provides said brake handle signal or said penalty brake handle signal as a function of said penalty input.

3. A system according to claim 2, wherein said penalty process provides said brake handle signal if the brake handle signal is at least a predetermined value during a penalty input.

4. A system according to claim 2, wherein said penalty process provides said brake handle signal in the absence of a penalty input.

5. A system according to claim 2, including an inactive input; and wherein said penalty process provides said brake handle signal in response to said inactive input which take precedence over said penalty input.

6. A system according to claim 2, including a mode input; and wherein said penalty process is inactive for a trail mode input.

7. A system according to claim 1, wherein said penalty process delays providing a penalty brake handle signal in response to said penalty input; including a corrective response input; and wherein said penalty process ignores said penalty input if a corrective response input is received before expiration of said delay.

8. A system according to claim 7, including means for monitoring the braking state of said train brakes, said corrective input is from said monitoring means, and said penalty process ignores said penalty input if a braking state is of a predetermined value before expiration of said delay.

9. A system according to claim 8, including a reservoir used to control said train braking, and said monitoring means monitors pressure in said reservoir.

10. A system according to claim 8, wherein said monitoring means monitors said brake handle signal.

11. A system according to claim 8, wherein said monitoring means provides said corrective signal when said braking state is of said predetermined value.

12. A system according to claim 1, wherein said penalty input is a penalty signal from one of an automatic train control switch or a deadman switch.

13. A computer controlled train brake system comprising:
    a brake handle input;
    a penalty input;
    a penalty process providing a penalty brake handle signal using said penalty input and said brake handle input; and
    a brake process controlling pneumatic train braking using said brake handle input and said penalty brake handle signal.

14. A system according to claim 13, wherein said penalty process and said brake process are software in a common processor.

15. A computer controlled train brake system comprising:
    a brake handle input;
    a penalty input;
    a penalty process providing a brake handle signal using said penalty input and said brake handle input;
    a reservoir used to control said train braking; and
    a brake means controlling pneumatic train braking by controlling pressure in said reservoir using said brake handle signal.

16. A system according to claim 15, including means monitoring the pressure in said reservoir; and said penalty process uses said pressure in said reservoir in providing said brake handle signal.

17. A system according to claim 16, said penalty process provides a penalty brake handle signal in response to said penalty input until a predetermined reduction in reservoir pressure is reached and then provides a lap brake handle signal.

18. A system according to claim 16, said penalty process provides a penalty brake handle signal in response to said penalty input if said reservoir has a predetermined minimum pressure.

19. A method of controlling a computer controlled train brake system having an electropneumatic brake controller, brake handle and brake pipe comprising the steps of:
    determining state of said brake handle;
    determining a penalty state;
    generating a penalty braking signal using said brake handle and penalty and states; and
    controlling said brake pipe by said controller using said brake handle state and said penalty braking signal.

20. A method according to claim 19, wherein said penalty braking signal is said brake handle state in the absence of a penalty state.

21. A method according to claim 19, including determining a trailing or leading mode state; and wherein said penalty braking signal is generated only for a leading mode state.

22. A method of controlling a computer controlled train brake system having an electropneumatic brake controller, brake handle and brake pipe comprising the steps of:
    determining state of said brake handle;
    determining a penalty state;
    determining state of braking;
    generating a braking signal using said brake handle, penalty and braking states;
    delaying generating said braking signal during a penalty state;
    generating said braking signal if a braking state of a predetermined value is not determined before expiration of said delay; and
    controlling said brake pipe by said controller using said braking signal.

23. A method according to claim 22, including a reservoir used to control said train braking, and determining said braking state includes determining the pressure in said reservoir.

24. A computer controlled train brake system comprising:
    a brake handle input;

a penalty input, a penalty process providing a brake handle signal using said penalty input and said brake handle input, and providing said brake handle input as said brake handle signal if the brake handle input is at least a predetermined value during a penalty input; and a brake means controlling pneumatic train braking using said brake handle signal.

25. A computer controlled train brake system comprising:

a brake handle input;

a penalty input, an inactive input;

a penalty process providing a brake handle signal using said penalty input, inactive input and said brake handle input, and providing said brake handle input as said brake handle signal in response to said inactive input which take precedence over said penalty input; and a brake means controlling pneumatic train braking using said brake handle signal.

26. A computer controlled train brake system comprising:

a brake handle input;

a penalty input;

a corrective response input;

a penalty process providing a brake handle signal using said penalty input, said corrective response input and said brake handle input;

said penalty process delays providing a penalty brake handle signal in response to said penalty input and ignores said penalty input if a corrective response input is received before expiration of said delay; and a brake means controlling pneumatic train braking using said brake handle signal.

27. A method of controlling a computer controlled train brake system having an electropneumatic brake controller, brake handle and brake pipe comprising the steps of:

determining state of said brake handle;

determining a penalty state;

determining state of braking;

generating a braking signal using said brake handle, penalty and braking states, said braking signal being said brake handle state if said brake handle state is at least a predetermined value during a penalty state; and controlling said brake pipe by said controller using said braking signal.

28. A method of controlling a computer controlled train brake system having an electropneumatic brake controller, brake handle and brake pipe comprising the steps of:

determining state of said brake handle;

determining a penalty state;

determining state of braking;

determining an inactive state;

generating a braking signal using said brake handle, penalty, inactive and braking states and said braking signal being said brake handle state during said inactive state which take precedence over said penalty state; and controlling said brake pipe by said controller using said braking signal.

29. A method of controlling a computer controlled train brake system having an electropneumatic brake controller, brake handle and brake pipe comprising the steps of:

determining state of said brake handle;

determining a penalty state;

determining state of braking;

determining a corrective response;

generating a braking signal using said brake handle, penalty, corrective response and braking states;

delaying generating said braking signal during a penalty state;

generating said braking signal if a corrective response is not received before expiration of said delay; and controlling said brake pipe by said controller using said braking signal.

* * * * *